(12) United States Patent
Lykkegaard

(10) Patent No.: US 10,745,150 B2
(45) Date of Patent: Aug. 18, 2020

(54) METHOD OF CLAIMING AIRCRAFT BAGGAGE

(71) Applicant: BEUMER Group A/S, Aarhus N (DK)

(72) Inventor: Uffe Lykkegaard, Aarhus C (DK)

(73) Assignee: Beumer Group A/S, Aarhus N (DK)

( * ) Notice: Subject to any disclaimer, the term of this patent is extended or adjusted under 35 U.S.C. 154(b) by 0 days.

(21) Appl. No.: 16/340,592

(22) PCT Filed: Oct. 13, 2017

(86) PCT No.: PCT/DK2017/050340
§ 371 (c)(1),
(2) Date: Apr. 9, 2019

(87) PCT Pub. No.: WO2018/077362
PCT Pub. Date: May 3, 2018

(65) Prior Publication Data
US 2019/0248512 A1    Aug. 15, 2019

(30) Foreign Application Priority Data

Oct. 24, 2016   (DK) ................................ 2016 70832

(51) Int. Cl.
*B65G 47/50*         (2006.01)
*B64F 1/36*          (2017.01)

(52) U.S. Cl.
CPC .................................. *B64F 1/368* (2013.01)

(58) Field of Classification Search
CPC .... B65G 47/50; B65G 47/503; B65G 47/506; B65G 47/844; B65G 2201/0264; B64F 1/368
(Continued)

(56) References Cited

U.S. PATENT DOCUMENTS 3,610,159 A * 10/1971 Fickenscher ............ B64F 1/368
                                                    104/88.05
3,695,462 A    10/1972 Sullivan
(Continued)

FOREIGN PATENT DOCUMENTS

EP    2 168 873 A2    3/2010
EP    2 772 440 B1    7/2015
(Continued)

OTHER PUBLICATIONS

International Search Report and Written Opinion issued in related PCT/DK2017/050340 on Jan. 3, 2018.

*Primary Examiner* — Joseph A Dillon, Jr.
(74) *Attorney, Agent, or Firm* — Woodard, Emhardt, Henry, Reeves & Wagner, LLP

(57) ABSTRACT

There is disclosed a method of passengers (118) claiming their baggage pieces (115) at an aircraft baggage claim area (106) of an airport. In order e.g. to provide such method which improves usage and availability and user experience in view of reference systems, the method includes providing (706) a plurality of destinations (16) at the aircraft baggage claim area of the airport and along each of two lateral sides (112), (114) of the material handling equipment, and choosing (708) towards which of the two lateral sides (112), (114) the one or more pieces of aircraft baggage (15) should be automatically and actively discharged into at least one of the plurality of destinations (116). The method further includes actively discharging (710) the one or more pieces of aircraft baggage (115) from the material handling equipment and into at least one of the destinations (116), and that the one or more aircraft passengers (118) are claiming (712) the one or more pieces of aircraft baggage (115) paired with the one or more aircraft passengers at the at least one destination (Continued)

when the one or more pieces of aircraft baggage is at rest and has stopped moving.

20 Claims, 4 Drawing Sheets

(58) Field of Classification Search
USPC ........ 198/349, 349.5, 349.7, 370.01, 370.02, 198/617, 890, 890.1; 414/273, 277, 278; 209/653
See application file for complete search history.

(56) References Cited

U.S. PATENT DOCUMENTS

| | | | | |
|---|---|---|---|---|
| 3,881,609 A * | 5/1975 | Ellis | .................. | B65G 47/50 |
| | | | | 198/349.6 |
| 4,416,435 A * | 11/1983 | Szendrodi | .............. | B64F 1/368 |
| | | | | 244/114 R |
| 4,732,260 A * | 3/1988 | Canziani | ................ | B07C 3/065 |
| | | | | 198/370.02 |
| 5,388,681 A * | 2/1995 | Bonnet | ................ | B65G 15/30 |
| | | | | 198/477.1 |
| 5,620,102 A * | 4/1997 | Finch, Jr. | ............... | B07C 5/362 |
| | | | | 209/583 |
| 6,108,636 A * | 8/2000 | Yap | ..................... | A45C 13/42 |
| | | | | 705/5 |
| 6,323,452 B1 * | 11/2001 | Bonnet | ................ | B07C 3/082 |
| | | | | 198/370.04 |
| 6,543,602 B1 * | 4/2003 | Bonnet | ................ | B65G 17/08 |
| | | | | 198/370.02 |
| 6,698,577 B1 * | 3/2004 | Conklin, Jr. | ............ | G09F 19/22 |
| | | | | 198/502.1 |
| 7,086,519 B2 * | 8/2006 | Veit | ........................ | B07C 5/362 |
| | | | | 198/370.02 |
| 8,297,430 B2 * | 10/2012 | Van Den Goor | .... | B65G 17/066 |
| | | | | 198/370.02 |
| 8,424,670 B2 * | 4/2013 | Van Den Goor | .... | B65G 47/844 |
| | | | | 198/370.02 |
| 9,315,278 B2 | 4/2016 | Song | | |
| 10,055,620 B2 * | 8/2018 | Bruce | ............... | G06K 7/10366 |
| 10,336,555 B1 * | 7/2019 | Kurdi | | |
| 10,407,183 B2 * | 9/2019 | Potters | ................... | B64F 1/368 |
| 2002/0040928 A1 | 4/2002 | Jalili | | |
| 2004/0050659 A1 | 3/2004 | Jensen | | |
| 2007/0068854 A1 | 3/2007 | Cerutti | | |
| 2010/0069047 A1 * | 3/2010 | Mehmet | ................. | G01V 15/00 |
| | | | | 455/414.1 |
| 2010/0076796 A1 | 3/2010 | Klein | | |
| 2011/0267192 A1 * | 11/2011 | Goldman | ............... | G06K 19/07 |
| | | | | 340/568.1 |
| 2012/0056723 A1 | 3/2012 | Zhu | | |
| 2013/0261792 A1 * | 10/2013 | Gupta | ................... | G06Q 10/08 |
| | | | | 700/232 |
| 2014/0241837 A1 | 8/2014 | Bartelet | | |
| 2014/0309768 A1 * | 10/2014 | Groot | .................. | B65G 47/844 |
| | | | | 700/223 |
| 2015/0197348 A1 | 7/2015 | Song | | |
| 2017/0362033 A1 * | 12/2017 | Mahfouz | ................ | G06Q 50/30 |

FOREIGN PATENT DOCUMENTS

| | | |
|---|---|---|
| GB | 1384593 | 2/1975 |
| WO | WO 2012/066346 A1 | 5/2012 |

* cited by examiner

METHOD OF CLAIMING AIRCRAFT BAGGAGE

FIELD OF THE INVENTION

The invention relates to ground installations specially adapted for handling aircraft baggage in an airport, and in particular to a method for handling aircraft baggage and for letting aircraft passengers claim their aircraft baggage.

BACKGROUND OF THE INVENTION

Automated airport baggage handling systems and equipment are used for handling of airport baggage at airports. Such systems are among others used to transport, distribute and possibly store baggage going in or out of the airport.

Typically, new, as well as existing, systems experience disadvantages related to their capacity, availability, cost and/or transit time and/or an average transport and/or retrieval period for a given baggage article and/or space requirements and/or various disadvantages when seen from a user perspective. In particular, for both new and existing solutions, improving one of these factors often has a too high and non-beneficial impact on one or more of the other factors.

When one or more baggage pieces arrive at an airport with an incoming aircraft they must be given back to, and thus claimed by, their one or more owners. Present systems for this task include so-called baggage claim carousels placed at an aircraft baggage claim area of the airport. Baggage pieces are unloaded from the airplane and typically put onto a conveyor at the airside of the airport by airport personnel. From here, the baggage is moved to a given baggage claim carousel provided at the aircraft baggage claim area of the airport, where it recirculates until someone removes the baggage from the baggage claim carousel and hereby claims the baggage.

When an airplane passenger who has previously checked in one or more pieces of aircraft baggage arrives at an airport with an aircraft, the passenger tends to hurry to a baggage claim carousel, which is dedicated baggage from the flight that the passenger arrived with. Reasons for this may be a typical wish of the passengers to retrieve their baggage quickly, so as to be able to attend following tasks quickly, such as shopping or exiting the airport. The one or more passengers sometimes try to keep speed with a group of other passengers from the same flight, possibly to try to assure that no one else by mistake claims baggage not belonging to them.

Upon arriving at the baggage claim carousel dedicated a given aircraft, most passengers are willing to and/or tend to wait at the carousel, and at a position where a border between the airside and the aircraft baggage claim area of the airport, and i.e. where the baggage pieces appear at first in the aircraft baggage claim area, can be monitored.

Other passengers are willing to or tend to position themselves where a first part of the baggage reclaim carousel can be monitored. Some passengers tend to want to position themselves as close to such position or border as possible.

When a passenger sees what appears to be hers or his baggage, some passengers walk or run in a direction towards the baggage, and sometimes, in a direction where most people are placed, in order to retrieve what may or may not be their baggage. This happens while the baggage is travelling on the baggage belt, and sometimes even while the passenger or one or more other passengers try to walk along, or even on, the baggage claim carousel. At the same time and while walking or even running towards the baggage, the passenger tries to figure out if the baggage seen is the correct baggage or not. In such situations, track of which other baggage pieces enter the carousel, or which baggage is removed from the carousel, can be lost, both for the given passenger, but e.g. also for other passengers who have to make space for the passenger moving towards what appears to be his or hers baggage.

Other situations possibly also leading to unfortunate user experiences may occur, such as passengers stepping over toes of other passengers when walking along the baggage claim carousel, e.g. when trying to drag their baggage from the carousel. Another example is passengers not being able to grip their baggage at a first pass of the baggage, and choosing to wait for the next pass of the baggage, or having to go to the other side of the carousel to get it, etc.

Still further, baggage may be removed from or put back by passengers on the baggage claim carousel in a rather fast and possibly also somewhat non-careful manner. It may be found that removal and/or putting baggage back on the carousel is carried out somewhat carelessly when seen from the view of the passengers waiting at the carousel, but additionally or alternatively also in terms of what typical baggage carousels or baggage pieces then must be capable of being subject to without being damaged.

Thus, the process of a passenger claiming checked in baggage, i.e. in a period after a passenger enters an airport with an aircraft, and until the passenger has retrieved aircraft baggage belonging to the passenger, may suffer from one or more of the described disadvantages.

Thus, it has been appreciated that an improved method for handling aircraft baggage and for letting aircraft passengers claim their aircraft baggage is of benefit, and in consequence the present invention has been devised.

SUMMARY OF THE INVENTION

It may be seen as an object of the present invention to provide an improved method of handling aircraft baggage from an incoming aircraft in an airport, and for letting one or more aircraft passengers claim their one or more pieces of aircraft baggage. Preferably, the invention alleviates, mitigates or eliminates one or more of the above or other disadvantages singly or in any combination.

In particular, it may be seen as an object of the invention to provide such system and method which improves usage of space and/or user experience when passengers claim their aircraft baggage at the aircraft baggage claim area of an airport.

Accordingly, there is provided a method for handling aircraft baggage from an incoming aircraft in an airport, and for letting one or more aircraft passengers claim their one or more pieces of aircraft baggage, the method comprising pairing the one or more aircraft passengers with the one or more pieces of aircraft baggage belonging to the one or more passengers, moving the one or more pieces of aircraft baggage on one or more conveying surfaces of automated material handling equipment in a moving direction, where the material handling equipment has two lateral sides transverse to the moving direction, and where the material handling equipment is capable of actively discharging the one or more pieces of aircraft baggage from the one or more conveying surfaces and into a destination towards one of the two lateral sides, providing a plurality of destinations at the aircraft baggage claim area of the airport and along each of both lateral sides of the material handling equipment, into which destinations the one or more pieces of baggage can be discharged from the material handling equipment, choosing towards which of the two lateral sides of the material handling equipment the one or more pieces of aircraft baggage should be automatically and actively discharged into at least one of the plurality of destinations, and while the one or more pieces of aircraft baggage are moving in the moving direction, actively discharging the one or more pieces of aircraft baggage from the material handling equipment and into at least one of the destinations at one of the lateral sides of the material handling equipment, where the at least one destination is accessible by the one or more passengers at an aircraft baggage claim area of the airport, and where the method further comprises that the one or more aircraft passengers are claiming the one or more pieces of aircraft baggage paired with the one or more aircraft passengers at the at least one destination when the one or more pieces of aircraft baggage is at rest and has stopped moving.

Thus, there is provided an improved method of handling aircraft baggage from an incoming aircraft in an airport, and for letting one or more aircraft passengers claim their one or more pieces of aircraft baggage. It may be seen that when the method includes the herein described method steps, an improved usage of space is provided and/or an improved user experience is provided when passengers have to claim their aircraft baggage at the aircraft baggage claim area of an airport.

The improvement may be seen to be provided when the method is carried out as disclosed herein. It may be seen that improved usage of both the material handling equipment and of the space at the aircraft baggage claim area is provided when compared to known systems and methods.

It is an insight and an advantage of the present technology, which is hereby disclosed, that when it is the material handling equipment which actively discharges the aircraft baggage, the forces experienced by the material handling equipment and by the aircraft baggage are controllable. This is seen as an advantage when compared to reference systems and methods, where a quite uncontrollable number of baggage pieces can be taken from a baggage claim carousel, e.g. possibly all at once, and in a more or less uncontrollable manner.

It may also be seen as an insight and an advantage of the present technology, which improves the technology over reference systems, to provide a plurality of destinations along each of both lateral sides of the material handling equipment, and choosing towards which of the two lateral sides of the material handling equipment the one or more pieces of aircraft baggage should be automatically and actively discharged. Hereby it may be seen that the present technology improves a requirement for floor space when compared to reference systems, where aircraft baggage can only be manually taken away from the baggage carousel towards one lateral side of the equipment relative to the moving direction of conveying surfaces in the equipment.

It may also be seen as an insight and an advantage giving e.g. improved safety of the present technology when compared with reference systems, that the one or more baggage pieces are at rest when claimed by the one or more passengers. In reference systems, the aircraft baggage pieces are moving in the carousel, which may lead to unfortunate user experiences, safety issues and possible difficulties with identification.

In particular, and e.g. by pairing the one or more pieces of aircraft baggage with the one or more passengers to which the baggage belongs and discharging the baggage at a unique separate and known destination as described herein, it may be seen that the method improves user experience and also usage of floor space and time in the airport when compared to known methods and systems. This may e.g. be seen to be due to the need or tendency for numerous passengers to be positioned or to monitor and/or to walk or run back and forth from certain positions of a reference baggage carousel system being overcome with the herein described method. Further, a need to be able to recognize and remember which piece(s) of aircraft baggage belongs to you as a passenger, is minimised or even prevented with the herein described method.

A destination can be defined as a unique and separate area with a size suitable for accumulation of one or more aircraft baggage pieces. Each destination preferably also has an extension along the moving direction of the one or more conveying surfaces so as to enable discharge of a baggage piece into a particular destination while the conveying surface moves in the moving direction.

According to embodiments of the invention, the method further comprises choosing to move the one or more pieces of aircraft baggage in a pull mode or in a push mode. This has the advantage that at least these two settings may be chosen from, e.g. in dependence of where and how many destinations are free to receive aircraft baggage pieces, an amount of incoming baggage etc., and so as to enable optimising usage of the system.

One particular scenario is when the pull mode is activated by a request from a passenger to which the one or more pieces of aircraft baggage belongs. It may be seen as an advantage that hereby the user experience for some passengers can even be further improved, since the passenger can e.g. be allowed to request and be allowed to have his or hers baggage delivered 30 minutes after the aircraft has arrived, so as e.g. to be able to shop or attend other matters until then. In some situations, passengers who want to delay the delivery of their baggage can help to minimise utilisation fluctuations, of the material handling system.

In an embodiment, and particularly for the pull mode, the one or more passengers can decide at which destination the one or more pieces of aircraft baggage shall be moved to, and discharged at. Then, an even further increase of a positive user experience can be expected, since the passenger can even decide on further matters in the process related to re-claiming the baggage. As an example this may happen by choosing between three different destinations, i.e. locations where it is possible for the system to move the baggage to. This can be provided by sending a text message by a mobile device, by using an application on a mobile device, such as a smartphone, or simply by passenger identification at a certain destination and possibly along with pushing a button which is free to receive input such as 'request to have your baggage delivered here'. Possibly only one such request needs to be provided and to be granted. It may also be that firstly a request to have the baggage delivered at a certain terminal can be made and possibly granted, then at a request for a certain device among e.g. 20 or 40 similar pieces of material handling equipment, and then at a single destination at one of the material handling devices.

In the push mode, the one or more pieces of aircraft baggage are moved to at least one destination which is free to receive the one or more pieces of aircraft baggage, and the one or more aircraft passengers are notified of which at least one destination to go to claim their baggage.

According to an embodiment of the invention, an election between moving a given piece of aircraft baggage in push or pull mode is provided in response to whether or not a request from a passenger to which the given piece of aircraft baggage belongs has been received and can be fulfilled, where the request should preferably be received within a predetermined and adjustable time period. As an example hereof, it may be decided by the system to push (i.e. move a piece of aircraft baggage in 'push mode') a given baggage piece to a certain destination, and preferably inform the passenger of the destination, unless the passenger has requested delivery, i.e. pulled the baggage to a free and otherwise obtainable destination within e.g. 5-10-15 minutes of arrival and/or from emptying of an aircraft, with which aircraft the given piece of aircraft baggage arrived and/or passenger arrived with.

For security, theft-similar and/or other reasons, verified and correct access to one or more pieces of aircraft baggage in the at least one destination is preferably provided in response to identification of a passenger. As an example it may be chosen, that only by identification of the passenger, and when this identification has previously been paired with the aircraft baggage pieces at the given destination, or with baggage to be delivered to the destination, a green light turns on at the destination. Otherwise a red light may be turned on. Identification and/or a given request by a passenger may be provided by, or accompanied by, swiping of boarding pass or baggage tag, or by use of a smartphone (e.g. using a machine readable code).

In particular, one or more or all of the destinations can be provided with a fencing, and access to the one or more pieces of aircraft baggage in the at least one destination area can be provided via identification of the one or more passengers to which the baggage in the at least one destination belongs. This can e.g. be provided via a lockable door, or a part of the fence which can slide to provide or prevent access, or similar.

In a particular embodiment the one or more pieces of aircraft baggage are invisible to any of the passengers until opening of the fencing at the at least one destination. Alternatively, the baggage pieces may at least be non-visible until the active discharge of the baggage from the material handling equipment. A possible reason for this is that there may be no incentive to monitor all the aircraft baggage pieces, e.g. since either the passenger has requested to have the baggage delivered to a certain destination, and has been granted this request, or the passenger has been notified which destination the baggage will arrive at.

Independent of the pull or push mode and e.g. also independent of which extent access to the baggage pieces is restricted, knowing that your baggage piece(s) end(s) in a very limited unique area and normally at a single separate destination, and stays there, is found to prevent most of the hassle which occurs using known reference systems.

In embodiments of the method according to the invention one or more or all of the destinations are able to accumulate two or more pieces of aircraft baggage. This improves the method even further, and also improves ability of the material handling equipment to accumulate more baggage pieces.

The method may still improve user experience etc. as elaborated herein when two or more aircraft baggage pieces belonging to two or more passengers or belonging to two or more groups of passengers are discharged into the same destination for collection by the two or more passengers or by the two or more groups of passengers. However, the number of passengers or number of groups of passengers for one destination should be somewhat limited, e.g. maximum three, four or five. This e.g. also depends on the number of baggage pieces each passenger has been paired with, and which thus belongs to the passenger, and may e.g. alternatively or additionally depend on special payment, present load of the material handling equipment, etc.

In an embodiment, and when e.g. a single passenger has a plurality of baggage pieces, it is foreseen as an advantage of the method to send a notification to go to a specific destination when the last piece of aircraft baggage is delivered or just briefly before such delivery. If a specific destination does not have space enough for multiple pieces of aircraft baggage belonging to the same passenger or group of passengers, it is preferred that destinations needed for the particular pieces of baggage are positioned as close to each other as possible in the baggage claim area. Thus, a passenger may need to make a request to book two or more destinations, or may be notified that remaining baggage pieces have been, or will be, delivered at a destination close by.

In an embodiment of the invention, and e.g. to assure that the baggage pieces are also collected minimum as fast as in the reference systems, one or more pieces of aircraft baggage may only be available for claiming in the at least one destination by the one or more passengers to which the aircraft baggage belongs within a predetermined and adjustable time period.

As an example and preferably after a period of time known to the passengers, uncollected baggage pieces may be collected by airport personnel as baggage which has not been claimed, or sent to an another location for collection.

A general insight that may be seen as an advantage of the present technology is that a border between the airside and the aircraft baggage claim area of the airport, and where aircraft baggage pieces may appear for the first time again for the passengers, is spread out over a larger area and includes separate unique locations of each a limited area and/or each with restricted access. Hereby improved flow of passengers and/or baggage to and from where the baggage is claimed may be seen to be improved when the method for claiming the baggage pieces is as described herein.

It is to be understood that the advantages and elaboration thereof for the system as disclosed herein, can be used for the method as disclosed herein and vice versa.

By referring to an advantage herein, it must be understood that this advantage may be seen as a possible advantage provided by the invention, but it may also be understood that the invention is particularly, but not exclusively, advantageous for obtaining the described advantage.

In general the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the figures, in which.

DESCRIPTION OF EMBODIMENTS

Figure 1:
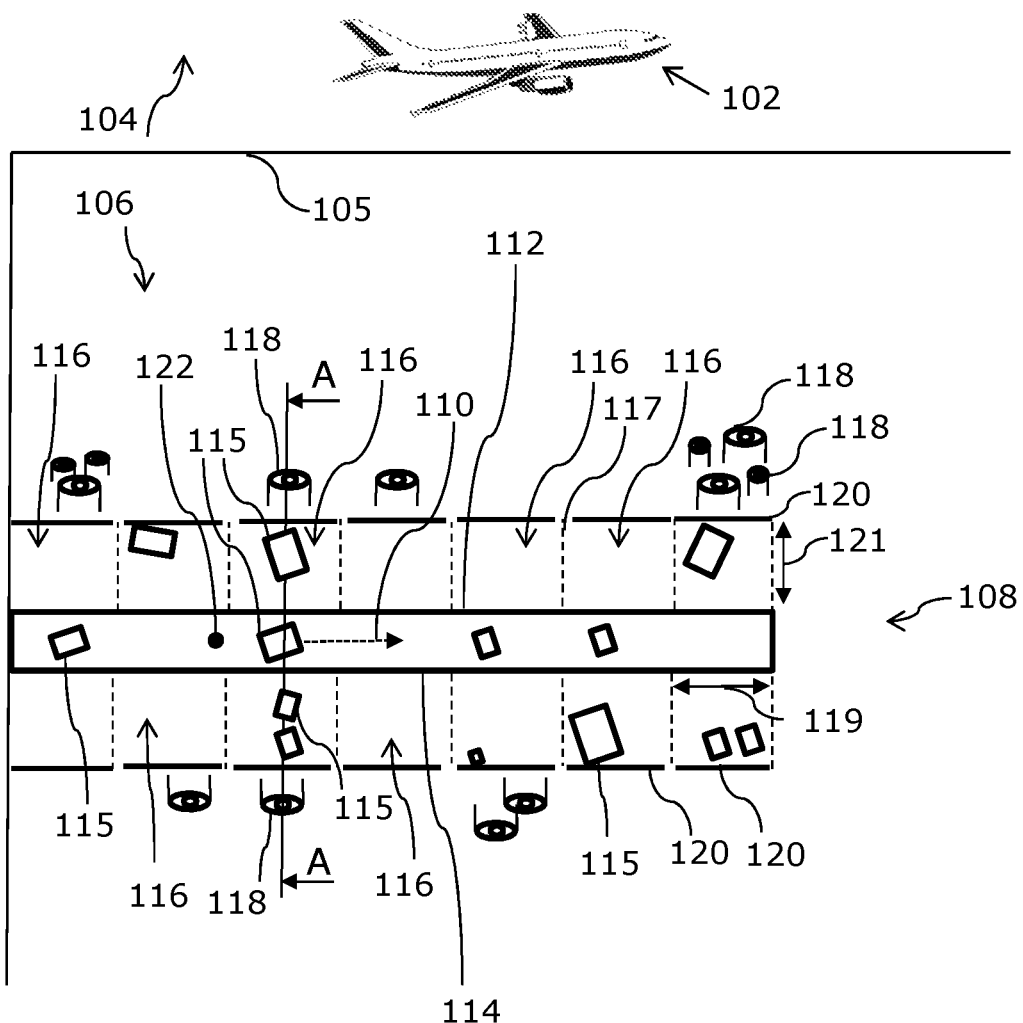
FIG. 1 illustrates a top view of material handling equipment adapted to perform the method described herein.

FIG. 1 illustrates a top view of material handling equipment 108 adapted to and used to perform the method described herein. A number of passengers 118 have arrived the airport with an aircraft 102 and have now reached the aircraft baggage claim area 106 of the airport. The intent of the passengers is to claim back their baggage which have previously been checked-in and handled by trained personnel.

A border between an airside 104 and an aircraft baggage claim area of the airport is illustrated with the line 105. At the airside 104 only personnel of the airport is allowed to handle aircraft baggage pieces that have previously been checked in, and thus have not been in care of a given passenger during a flight.

There is illustrated automated material handling equipment 108 with one or more conveying surfaces 122 moving aircraft baggage pieces 115 in a moving direction 110 as illustrated. ID of the baggage pieces have previously been paired, i.e. correlated to, one or more passengers 118, typically at check-in of the baggage.

As illustrated the material handling equipment has two lateral sides 112, 114 transverse to the moving direction 110. Thus, the material handling equipment has a left and a right side when seen relative to the moving direction of a piece of aircraft baggage at a given position and when the aircraft baggage pieces move in the moving direction 110. The material handling equipment 108 is capable of actively discharging the one or more pieces of aircraft baggage 115 from the one or more conveying surfaces 122 and into a destination 116 towards one of the two lateral sides 112, 114. Thus, at least some pieces of aircraft baggage 115 are actively discharged to the left side and some are actively discharged to the right side.

Means for actively discharging the aircraft baggage pieces from the material handling equipment may comprise one or more pushers adapted to push a given piece of aircraft baggage cross-wise to the moving direction 110, and/or other means such as cross-belts or tiltable plates. In the embodiments illustrated herein, the conveying surfaces are cross-belts which are moved in the moving direction 110, but which are also operable to move in a cross-wise direction so as to enable discharging the baggage piece in either of the lateral directions cross-wise to the moving direction 110 of the conveying surface.

There is illustrated a plurality of destinations 116 along each of both lateral sides 112, 114, into which destinations the one or more pieces of baggage 115 can be discharged from the material handling equipment.

In response to identification of a baggage piece and knowledge of at which of the destinations 116, a passenger to which the baggage pieces belong has been informed to collect the baggage piece or has requested to have the particular baggage piece delivered, the piece of aircraft baggage is automatically and actively discharged into the destination 116.

Figure 2:
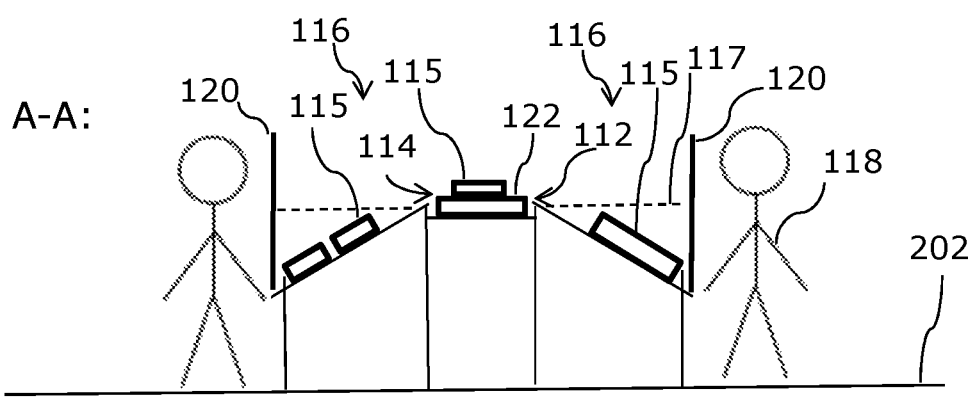
FIG. 2 illustrates a cross-sectional view along A-A indicated in FIG. 1, FIGS. 3-6 are perspective views of material handling equipment adapted to perform the method described herein.
Figure 3:
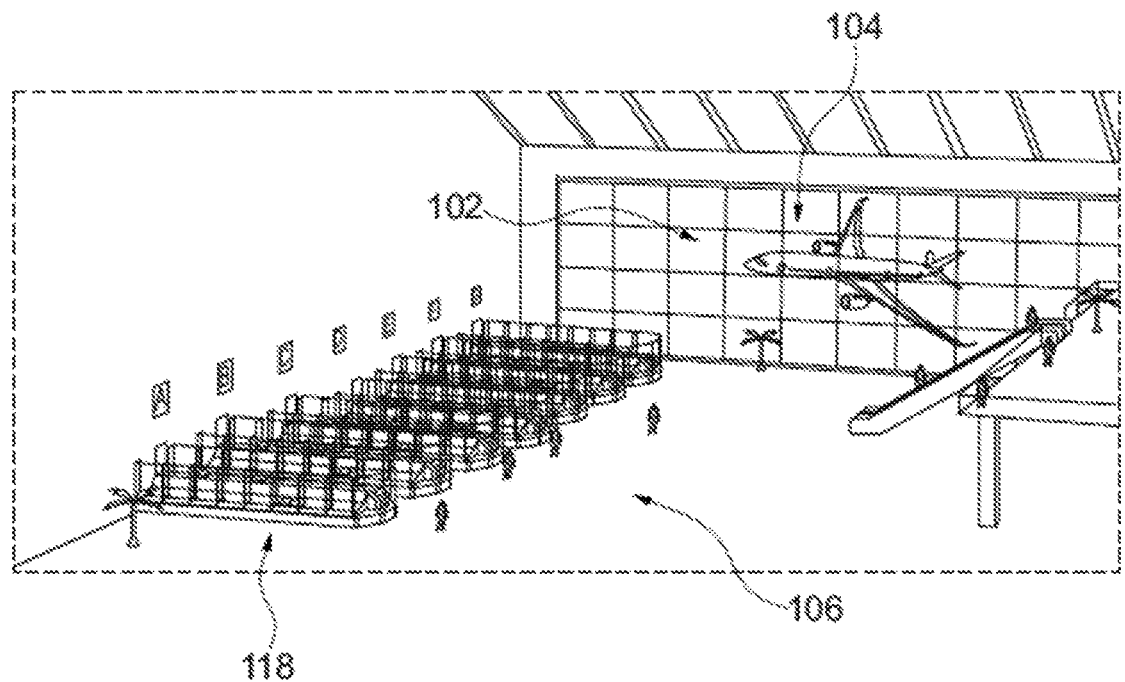
Figure 4:
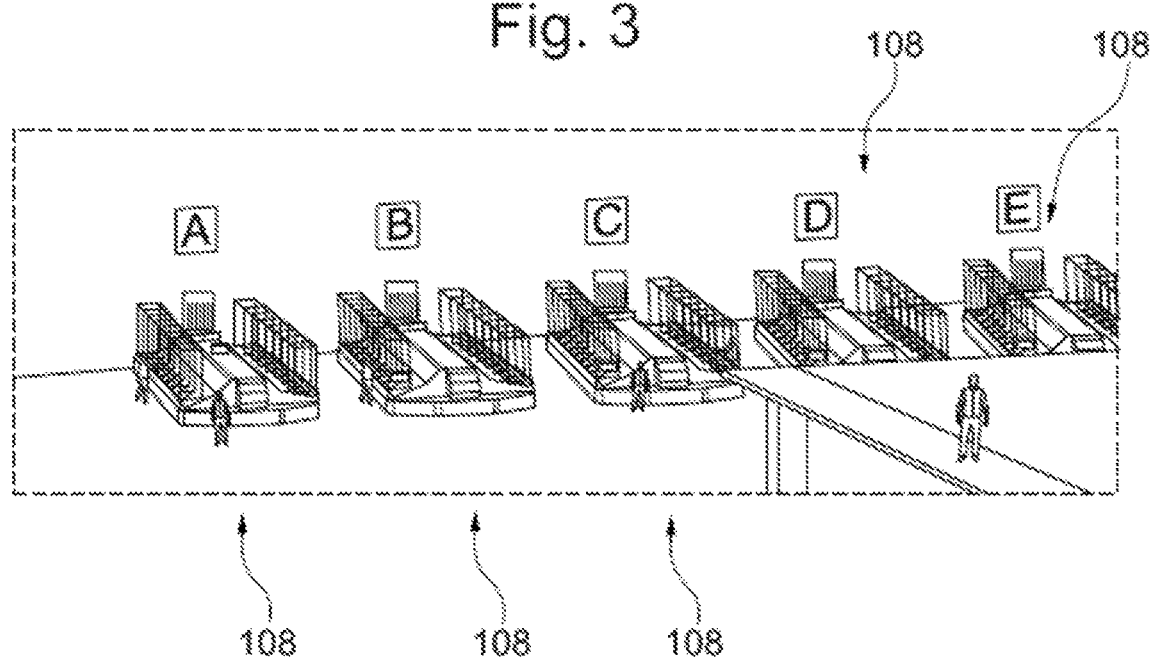
Figure 5:
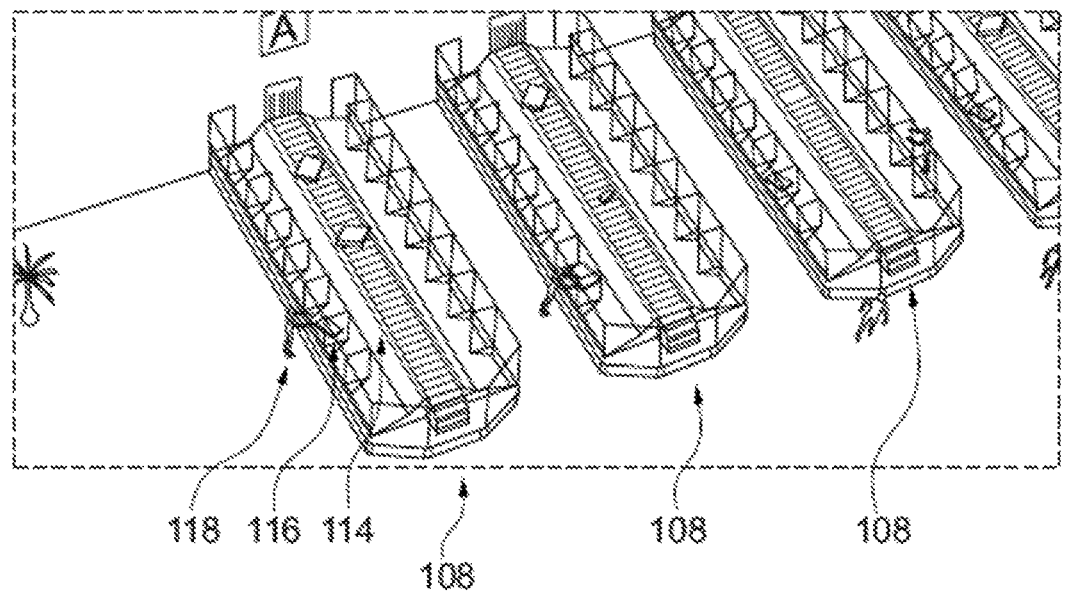
Figure 6:
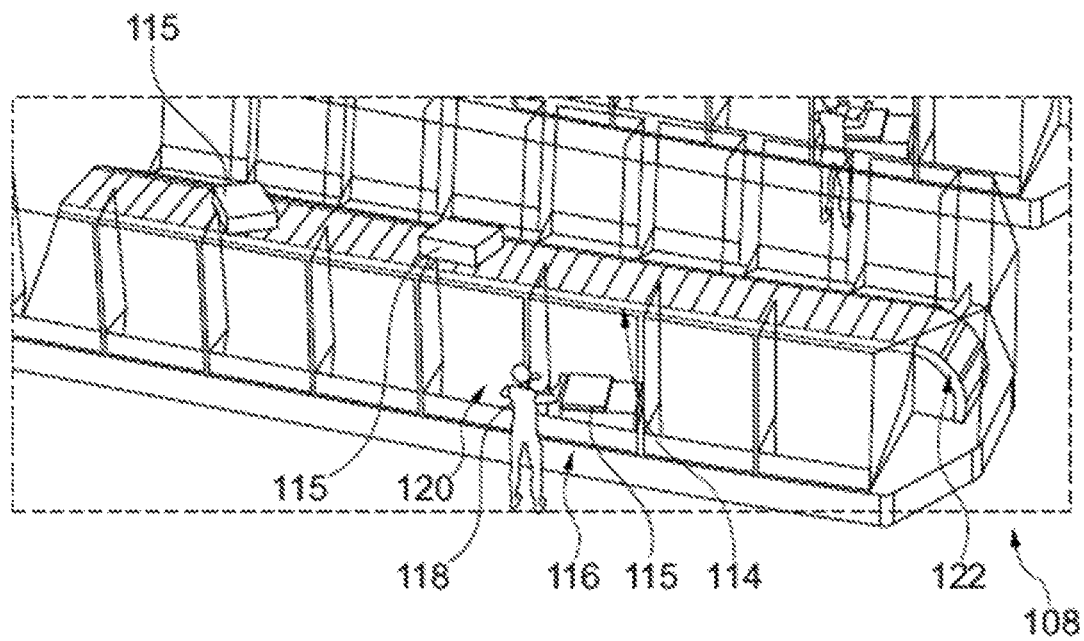

A destination 116 is a unique area which the material handling equipment is adapted to be able to automatically and actively discharge one or more baggage pieces into, so as to separate the one or more baggage pieces from others in the separate and unique area. In FIG. 2 it is more visible that the area can as an example be provided by an angled plate onto which the baggage pieces gently slides towards an end of, and from which end a passenger can collect the baggage when the one or more pieces of aircraft baggage is at rest and has stopped moving. As seen, the passengers cannot easily, or not at all, reach moving parts of the material handling equipment, e.g. due to a possible fencing, but at least due to the space to the lateral side of the material handling equipment that the destinations occupy. This can be seen to improve safety, but may further be seen as having the advantage that the conveying surfaces can then move faster in the moving direction 110 than reference systems, giving increased capacity when compared to reference systems. Among others depending on the size and number of baggage pieces that a given destination is provided to collect, for subsequent claiming by a specific passenger, a width 119, i.e. in the moving direction 110 of the conveying surfaces may be such as 1, 1.5, 2, 2.5 or 3 metres, while a length 121 of a given destination may be approximately 1-2 metres.

Preferably, each destination is provided with an angled collection part, or with any other form, leading the aircraft baggage pieces, e.g. at least partly by gravity, from a height level of the conveying surfaces which move the baggage pieces until discharge above the floor in the baggage claim area, of e.g. 1.5-2 metres, and to a level where the passenger can e.g. most easily collect them, of e.g. 0.3-0.75 metre.

The destinations may or may not have their physical separation from each other increased, such as by an upward extending barrier, plate 117, net or similar between some or all of the destinations 116. The purpose of the barrier may be for safety and/or such as to make it more difficult, or even practically impossible, for a given passenger to reach a piece of baggage in another or a neighbouring destination when standing at a certain destination and/or through a possible door at a possible fence in front of the certain destination. Further, an upward extending barrier may be seen to increase the moving speed in the moving direction of the conveying surfaces, with which a certain sized piece of aircraft baggage can be discharged and collected in a destination 116 with a certain width 119.

As illustrated, passengers are given access to a plurality of destinations 116 along two lateral sides transversely to and relatively to a single moving direction 110. The single moving direction is the direction which a baggage piece moves just prior to discharging the baggage piece. As illustrated, the baggage pieces only move in a single direction until discharge, i.e. the baggage pieces do not move back (recirculate) in an opposite direction. As illustrated, the material handling equipment 108 used and embodied herein has a closed loop with conveying surfaces that returns in a vertical loop. This gives access to both lateral sides of the material equipment, when seen in one moving direction of the conveying surfaces, without having to pass over or under the material handling equipment, which is also seen as an advantage.

It is furthermore illustrated that passengers have access to floor space at the aircraft baggage claim area of the airport and just in front of the destination from which they are able to reach their baggage by hand and claim their baggage, possibly while a green or red light is appearing and/or in dependence of e.g. opening a door in a fence 120 along the destinations 116, which fence 120 generally surrounds the equipment 108.

After having collected their baggage piece at a destination, the system and equipment may possibly automatically detect, such as by vision means and/or detection means, that the destination is free for usage by another passenger and other pieces of baggage again. Alternatively or additionally, this may follow by feedback from the passenger.

FIG. 2 illustrates a cross-sectional view along A-A indicated in FIG. 1, and where the equipment as described in FIG. 1 is shown in a view from an end, and with a floor 202 at the aircraft baggage claim area.

FIGS. 3-6 are perspective views of material handling equipment 108 described herein and adapted to perform the method described herein.

Figure 7:
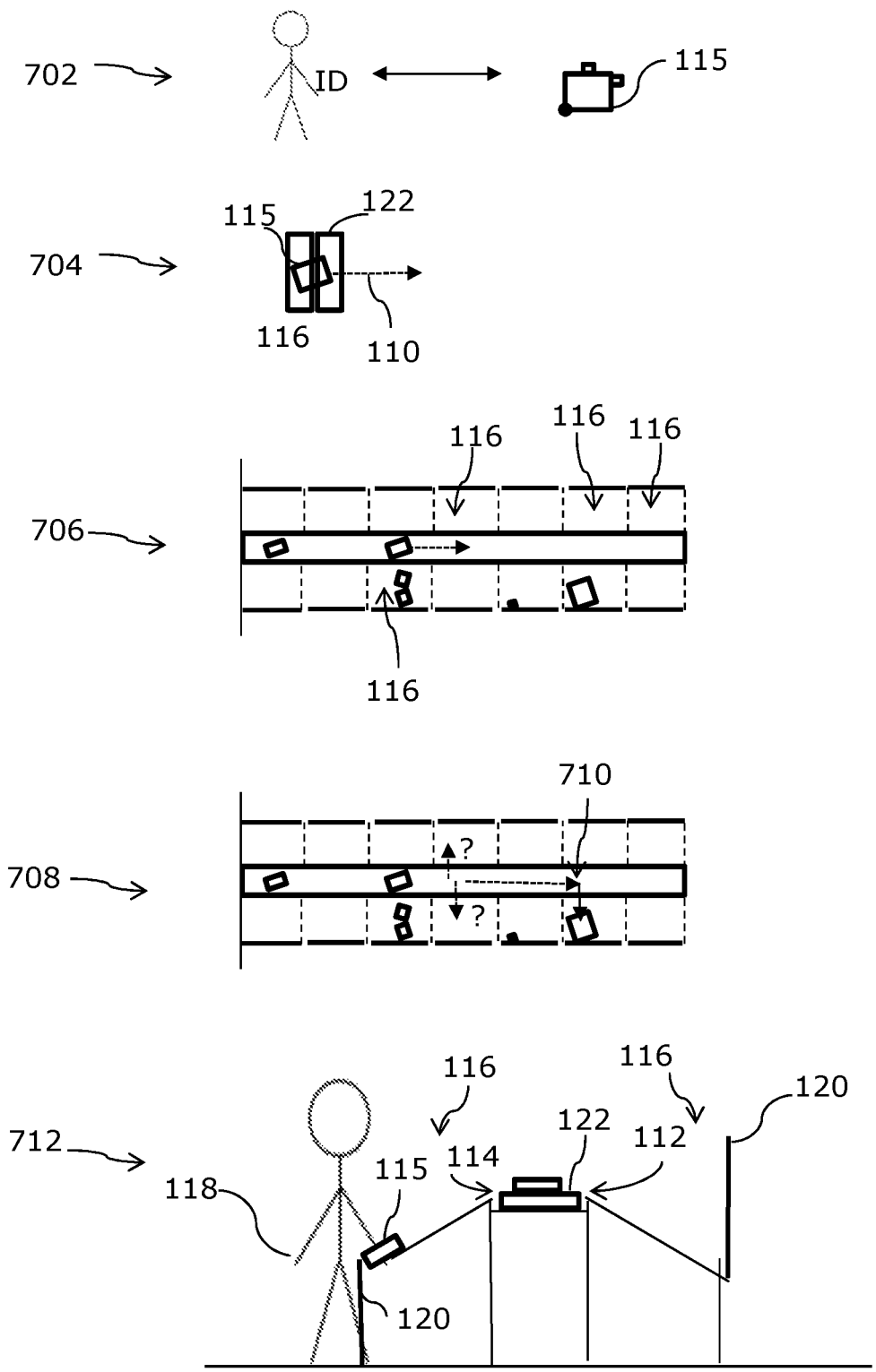
FIG. 7 is an illustration of the method according to the invention.

FIG. 7 illustrates the method for handling aircraft baggage 115 from an incoming aircraft in an airport, and for letting one or more aircraft passengers 118 claim their one or more pieces of aircraft baggage 115. Thus, the illustration illustrates pairing 702 the one or more aircraft passengers 118 with the one or more pieces of aircraft baggage 115 belonging to the one or more passengers, and moving 704 the one or more pieces of aircraft baggage 115 on one or more conveying surfaces 122 of automated material handling equipment 108 in a moving direction 110. The material handling equipment has two lateral sides 112, 114 in a horizontal or substantially horizontal plane and transverse to the moving direction 110, i.e. a right and a left side when seen in the moving direction 110. The material handling equipment 108 is capable of actively discharging the one or more pieces of aircraft baggage 115 from the one or more conveying surfaces 122 and into a destination 116 towards one of the two lateral sides 112, 114. It is furthermore illustrated that the method includes providing 706 a plurality of destinations 116 at the aircraft baggage claim area of the airport and along each of both lateral sides 112, 114 of the material handling equipment, into which destinations the one or more pieces of baggage 115 can be discharged from the material handling equipment. As illustrated, the method further includes choosing 708 towards which of the two lateral sides 112, 114 of the material handling equipment the one or more pieces of aircraft baggage 115 should be automatically and actively discharged into at least one of the plurality of destinations 116. It follows that discharge is preferably provided while the one or more pieces of aircraft baggage are moving in the moving direction 110, among others to increase capacity of the material handling system.

The arrow pointing towards where the baggage pieces start to be discharged, illustrates actively discharging 710 the one or more pieces of aircraft baggage 115 from the material handling equipment and into one of the destinations 116 at one of the lateral sides 112, 114 of the material handling equipment, here the right side. The at least one destination 116 at the aircraft baggage claim area is accessible by the one or more passengers at the baggage claim area 106 of the airport. As illustrated, the method further comprises that the one or more aircraft passengers 118 are claiming 712 the one or more pieces of aircraft baggage 115 paired with the one or more aircraft passengers at the at least one destination 10 when the one or more pieces of aircraft baggage is at rest and has stopped moving. This gives a number of advantages as elaborated herein, but further has the advantage that the conveying surfaces can move faster than the reference systems, since baggage pieces do not need to be drawn from the carousel 'on the fly'.

It is to be understood, that e.g. storing information about which passengers' ID has been paired to which aircraft baggage pieces belonging to the passenger, keeping track of where a given piece of aircraft baggage is in the material handling equipment, e.g. for knowing when to actively discharge the piece of baggage at the destination with the passenger to which it belongs and control of the equipment as described herein is provided by e.g. suitable storage and computation means, i.e. a computer storage and a controller adapted to perform the tasks as described and disclosed herein.

In short, there is herein disclosed a method of passengers 118 claiming their baggage pieces 115 at an aircraft baggage claim area 106 of an airport. In order e.g. to provide such method which improves usage and availability and user experience in view of reference systems, the method includes providing 706 a plurality of destinations 116 at the aircraft baggage claim area of the airport and along each of two lateral sides 112, 114 of the material handling equipment, and choosing 708 towards which of the two lateral sides 112, 114 the one or more pieces of aircraft baggage 115 should be automatically and actively discharged into at least one of the plurality of destinations 116. The method further includes actively discharging 710 the one or more pieces of aircraft baggage 115 from the material handling equipment and into at least one of the destinations 116, and that the one or more aircraft passengers 118 are claiming 712 the one or more pieces of aircraft baggage 115 paired with the one or more aircraft passengers at the at least one destination when the one or more pieces of aircraft baggage is at rest and has stopped moving.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. A method for handling aircraft baggage from an incoming aircraft in an airport, and for letting one or more aircraft passengers claim their one or more pieces of aircraft baggage, the method comprising pairing the one or more aircraft passengers with the one or more pieces of aircraft baggage belonging to the one or more passengers, moving the one or more pieces of aircraft baggage on one or more conveying surfaces of automated material handling equipment in a moving direction, where the material handling equipment has two lateral sides transverse to the moving direction, and where the material handling equipment is capable of actively discharging the one or more pieces of aircraft baggage from the one or more conveying surfaces and into a destination towards one of the two lateral sides, provided with a plurality of destinations at the aircraft baggage claim area of the airport and along each of both lateral sides of the material handling equipment, into which destinations the one or more pieces of baggage can be discharged from the material handling equipment, where one or more or all of the destinations are provided with a fencing, choosing towards which of the two lateral sides of the material handling equipment the one or more pieces of aircraft baggage should be automatically and actively discharged into at least one of the plurality of destinations, and while the one or more pieces of aircraft baggage are moving in the moving direction, actively discharging the one or more pieces of aircraft baggage from the material handling equipment and into at least one of the destinations at one of the lateral sides of the material handling equipment, where the at least one destination is accessible by the one or more passengers at an aircraft baggage claim area of the airport, and where the method further comprises that the one or more aircraft passengers are claiming the one or more pieces of aircraft baggage paired with the one or more aircraft passengers at the at least one destination when the one or more pieces of aircraft baggage is at rest and has stopped moving.

2. The method according to claim 1, the method further comprising choosing to move the one or more pieces of aircraft baggage in a pull mode or in a push mode.

3. The method according to claim 1, the method further comprising choosing to move the one or more pieces of aircraft baggage in either one of at least two modes, a pull mode and a push mode.

4. The method according to claim 2, wherein the pull mode is activated by a passenger to which the one or more pieces of aircraft baggage belongs, and by a request from the passenger.

5. The method according to claim 4, wherein, in the pull mode, the one or more passengers can decide at which destination the one or more pieces of aircraft baggage shall be moved to, and discharged at.

6. The method according to claim 2, wherein, in the push mode, the one or more pieces of aircraft baggage are moved to at least one destination which is free to receive the one or more pieces of aircraft baggage, and the one or more aircraft passengers are notified of which at least one destination to go to claim their baggage.

7. The method according to claim 2, wherein an election between moving a given piece of aircraft baggage in push or pull mode is provided in response to whether or not a request from a passenger to which the given piece of aircraft baggage belongs has been received and can be fulfilled, within a predetermined and adjustable time period.

8. The method according to claim 1, where access to the one or more pieces of aircraft baggage in the at least one destination is provided in response to identification of a passenger.

9. The method according to claim 1, where access to the one or more pieces of aircraft baggage in the at least one destination area is provided via identification of the one or more passengers to which the baggage in the at least one destination belongs.

10. A method for handling aircraft baggage from an incoming aircraft in an airport, and for letting one or more aircraft passengers claim their one or more pieces of aircraft baggage, the method comprising pairing the one or more aircraft passengers with the one or more pieces of aircraft baggage belonging to the one or more passengers, moving the one or more pieces of aircraft baggage on one or more conveying surfaces of automated material handling equipment in a moving direction, where the material handling equipment has two lateral sides transverse to the moving direction, and where the material handling equipment is capable of actively discharging the one or more pieces of aircraft baggage from the one or more conveying surfaces and into a destination towards one of the two lateral sides, providing a plurality of destinations at the aircraft baggage claim area of the airport and along each of both lateral sides of the material handling equipment, into which destinations the one or more pieces of baggage can be discharged from the material handling equipment, where one or more or all of the destinations are provided with a fencing, and access to the one or more pieces of aircraft baggage in the at least one destination area is provided via identification of the one or more passengers to which the baggage in the at least one destination belongs, choosing towards which of the two lateral sides of the material handling equipment the one or more pieces of aircraft baggage should be automatically and actively discharged into at least one of the plurality of destinations, and while the one or more pieces of aircraft baggage are moving in the moving direction, actively discharging the one or more pieces of aircraft baggage from the material handling equipment and into at least one of the destinations at one of the lateral sides of the material handling equipment, where the at least one destination is accessible by the one or more passengers at an aircraft baggage claim area of the airport, where the one or more pieces of aircraft baggage are invisible to any of the passengers until opening a door of the fencing or sliding a part of the fencing at the at least one destination, and where the method further comprises that the one or more aircraft passengers are claiming the one or more pieces of aircraft baggage paired with the one or more aircraft passengers at the at least one destination when the one or more pieces of aircraft baggage is at rest and has stopped moving.

11. The method according to claim 1, where one or more or all of the destinations are able to accumulate two or more pieces of aircraft baggage.

12. The method according to claim 1, where two or more aircraft baggage pieces belonging to two or more passengers or belonging to two or more groups of passengers are discharged into the same destination for collection by the two or more passengers or by the two or more groups of passengers.

13. The method according to claim 1, wherein the one or more pieces of aircraft baggage are only available for claiming in the at least one destination by the one or more passengers to which the aircraft baggage belongs within a predetermined and adjustable time period.

14. The method according to claim 3, wherein the pull mode is activated by a passenger to which the one or more pieces of aircraft baggage belongs, and by a request from the passenger.

15. The method according to claim 3, wherein, in the push mode, the one or more pieces of aircraft baggage are moved to at least one destination which is free to receive the one or more pieces of aircraft baggage, and the one or more aircraft passengers are notified of which at least one destination to go to claim their baggage.

16. The method according to claim 3, wherein an election between moving a given piece of aircraft baggage in push or pull mode is provided in response to whether or not a request from a passenger to which the given piece of aircraft baggage belongs has been received and can be fulfilled, within a predetermined and adjustable time period.

17. The method according to claim 1, further comprising stopping the one or more pieces of aircraft baggage in the at least one of the destinations at a height of 0.3 to 0.75 metre above a floor in the at least one of the destinations.

18. The method according to claim 1, wherein all of the destinations are provided with the fencing.

19. The method according to claim 1, further comprising opening a door or sliding a part of the fencing at the destination to provide the one or more aircraft passengers access to the one or more pieces of aircraft baggage at the destination.

20. The method according to claim 19, where the door is opened or the part of the fencing is slid in response to identification of a passenger to provide access to the one or more pieces of aircraft baggage in the at least one destination.

\* \* \* \* \*